(12) United States Patent  (10) Patent No.: US 8,515,365 B2
Pan et al.  (45) Date of Patent: Aug. 20, 2013

(54) SIGNAL PROCESSING CIRCUIT AND METHOD THEREOF

(75) Inventors: Bo Pan, Irvine, CA (US); Ching-Wei Ling, Tainan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 380 days.

(21) Appl. No.: 13/025,645

(22) Filed: Feb. 11, 2011

(65) Prior Publication Data

US 2012/0207235 A1  Aug. 16, 2012

(51) Int. Cl.
*H04B 1/04* (2006.01)
(52) U.S. Cl.
USPC .............. 455/121; 455/276.1; 455/278.1; 455/296; 455/137; 375/267
(58) Field of Classification Search
USPC .............. 455/22, 23, 550.1, 101, 114.2, 121, 455/133, 137, 139, 276.1, 278.1, 296, 334; 375/267; 324/656, 83 R, 133; 702/189; 370/396; 329/306
See application file for complete search history.

(56) References Cited

U.S. PATENT DOCUMENTS

| | | | |
|---|---|---|---|
| 4,721,904 A * | 1/1988 | Ozaki et al. | 324/76.77 |
| 5,459,431 A * | 10/1995 | Besson | 329/306 |
| 6,147,544 A * | 11/2000 | Tanizaki et al. | 327/403 |
| 2005/0118976 A1* | 6/2005 | Murakami et al. | 455/313 |
| 2006/0273911 A1* | 12/2006 | Nakagawa | 340/572.7 |
| 2007/0116015 A1* | 5/2007 | Jones | 370/396 |
| 2007/0252759 A1* | 11/2007 | Brunasso et al. | 342/383 |
| 2008/0109190 A1* | 5/2008 | Bauer et al. | 702/189 |
| 2009/0322639 A1* | 12/2009 | Lai | 343/770 |
| 2011/0038429 A1* | 2/2011 | Sako et al. | 375/259 |
| 2011/0109238 A1* | 5/2011 | Tang et al. | 315/250 |

* cited by examiner

*Primary Examiner* — Tan Trinh
(74) *Attorney, Agent, or Firm* — Birch, Stewart, Kolasch & Birch, LLP

(57) ABSTRACT

A signal processing circuit is disclosed, comprising a first node for coupling with a first antenna, a second node for coupling with a second antenna, a third node for receiving a first signal from a transmitting circuit, a fourth node for coupling with a receiving circuit, a signal dividing circuit, a phase shifting circuit, and a signal combining circuit. The signal dividing circuit divides the first signal into a second signal and a third signal, and transmits the second signal to the first antenna. The phase shifting circuit shifts the phase of the third signal to generate a fourth signal for canceling at least part of a coupled signal between the third node and the fourth node. The signal combining circuit combines the fourth signal and a fifth signal received from the second antenna, and transmits the combined signal to the receiving circuit.

16 Claims, 4 Drawing Sheets

SIGNAL PROCESSING CIRCUIT AND METHOD THEREOF

BACKGROUND

The present disclosure generally relates to a signal processing circuit, and more particularly, to a signal processing circuit utilized in a multiple-antenna device.

In wireless communications, the utilization of multiple antennas may effectively enhance the system performance. The antennas may be used to provide the antenna diversity, the multiple-input-multiple-output (MIMO) function, etc. For example, IEEE 802.11n devices and long-term-evolution (LTE) devices have utilized multiple antennas for providing the MIMO function.

The utilization of multiple antennas, however, may also bring side effects. For example, the signals transmitted from one antenna may be coupled with another antenna and act as noise or interference in the receiving circuit. The coupled signals, therefore, degrade the system performance.

In some devices, the distance between the antennas is increased for reducing the coupling effect. In other applications, isolators may also be used to reduce the coupling effect. As the dimensions of the electronic devices keep shrinking and more elements are built in, the coupling effect becomes even more severe and deteriorates the system performance. Increasing the distance between the electronic elements is not always possible because of the limited physical space of the electronic device. On the other hand, isolators also take a lot of space and are therefore not feasible in many applications. Moreover, isolators often possess a limited bandwidth and may not provide satisfactory isolation.

SUMMARY

In view of the foregoing, it is appreciated that a substantial need exists for the device and method for reducing the coupling effect in the multiple-antenna devices to mitigate the problems mentioned above.

An example embodiment of a signal processing circuit, comprising: a first node for coupling with a first antenna; a second node for coupling with a second antenna; a third node for receiving a first signal from a transmitting circuit; a signal dividing circuit, coupled with the first node and the third node, for dividing the first signal into a second signal and a third signal and transmitting the second signal to the first antenna; a phase shifting circuit, coupled with the signal dividing circuit, for shifting the phase of the third signal to generate a fourth signal; and a signal combining circuit, coupled with the phase shifting circuit and the second node, for combining the fourth signal and a fifth signal received from the second antenna, wherein the fourth signal cancels at least part of a coupled signal coupled between the third node and the fourth node.

An example embodiment of a communication method, comprising: dividing a first signal into a second signal and a third signal; transmitting the second signal to a first antenna; shifting the phase of the third signal to generate a fourth signal; receiving a fifth signal from a second antenna; combining the fourth signal and the fifth signal; and canceling at least part of a coupled signal coupled between the first antenna and the second antenna with the fourth signal.

An example embodiment of a communication device, comprising: a first node for coupling with a first antenna; a second node for coupling with a second antenna; a third node for coupling with a transmitting circuit; a fourth node for coupling with a receiving circuit; and a signal processing means, coupled with the first, the second, the third, and the fourth nodes, for receiving a first signal from the transmitting circuit, dividing the first signal into a second signal and a third signal, transmitting the second signal to the first antenna, shifting the phase of the third signal to generate a fourth signal, combining the fourth signal and a fifth signal received from the second antenna, and transmitting the combined signal to the receiving circuit, wherein the fourth signal cancels at least part of a coupled signal coupled between the third node and the fourth node.

It is understood that both the foregoing general descriptions and the following detailed descriptions are exemplary and explanatory only and are not restrictive of the invention, as claimed.

DETAILED DESCRIPTION

Reference will be made in detail to exemplary embodiments of the disclosure, which are illustrated in the accompanying drawings. The same reference numbers may be used throughout the drawings to refer to the same or like parts or operations.

Certain terms are used throughout the description and the following claims to refer to particular components. As one skilled in the art will appreciate, a component may be referred to as different names. This disclosure does not intend to distinguish between components that differ in name but not in function. In the following description and in the claims, the terms "include" and "comprise" are used in an open-ended fashion, and thus should be interpreted to mean "include, but not limited to" The phrase "coupled with" is intended to compass any indirect or direct connection. Accordingly, if this disclosure mentioned that a first device is coupled with a second device, it means that the first device may be directly or indirectly connected to the second device through an electrical connection, wireless communications, optical communications, or other signal connections with/without other intermediate device or connection means.

Figure 1:
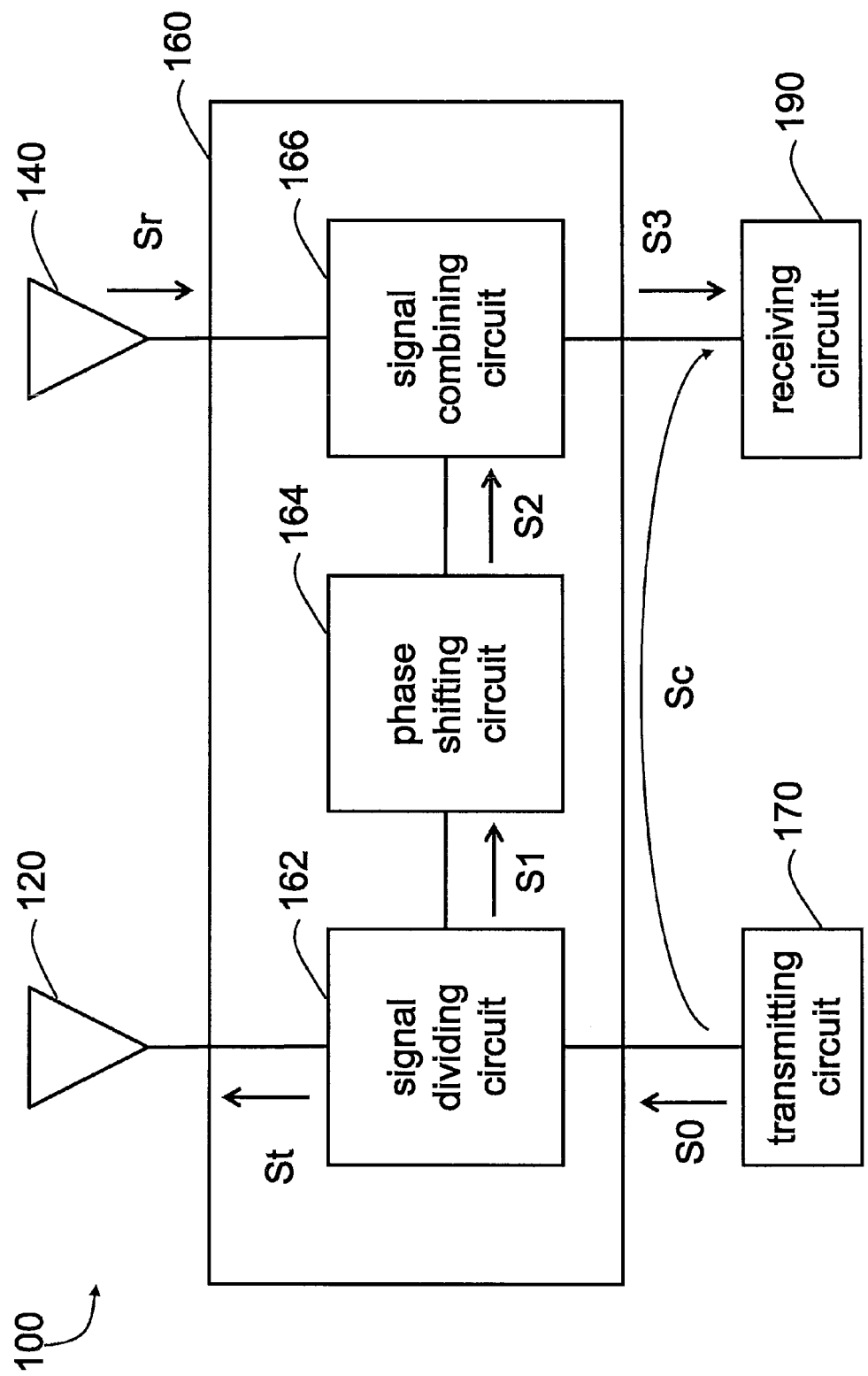
FIG. 1 shows a simplified block diagram of an example multiple-antenna communication device.

FIG. 1 shows a simplified block diagram of an example multiple-antennas communication device 100. The communication device 100 comprises antennas 120 and 140, a signal processing circuit 160, a transmitting circuit 170, and a receiving circuit 190. The signal processing circuit 160 comprises a signal dividing circuit 162, a phase shifting circuit 164, and a signal combining circuit 166. Other components and connections are omitted for conciseness.

The antennas 120 and 140 may be realized with any appropriate type of antennas, for example, dipole antennas, printed circuit antennas, non-planar antennas, and antenna arrays. The circuits 160, 162, 164, 166, 170, and 190 may be realized with discrete circuits, integrated circuits, processors, specific hardware, software, the collaboration of hardware and software, and/or other possible means.

The antennas 120 and 140 may be used to transmit and/or receive signals jointly or separately. The transmitting circuit 170 is used to generate signals for trans-mission and the receiving circuit 190 is used to process the received signals.

As shown in FIG. 1, the communication device 100 transmits the signal St and receives the signal Sr through the antennas 120 and 140, respectively. The transmitting circuit 170 transmits the signal S0 to the signal diving circuit 162. Besides, a coupled signal Sc represents the component of the signal S0 coupled from the transmitting circuit 170 to the receiving circuit 190. The coupled signal Sc is illustrated for easier comprehension only. In reality, the signal S0 may be coupled from the antenna 120 to the antenna 140, through the common ground between the transmitting circuit 170 and the receiving circuit 190, or other possible coupling paths between the transmitting circuit 170 and the receiving circuit 190.

The signal diving circuit 162 receives the signal S0 from the transmitting circuit 170 and divides it into the signals St and S1. In this embodiment, the signals St and S1 are attenuated signals of the signal S0. The signal St is transmitted to the antenna 120. The signal S1 has substantially the same amplitude as the coupled signal Sc, and is transmitted to the phase shifting circuit 164. The phase shifting circuit 164 receives the signal S1 and shifts the phase of the signal S1 to generate a signal S2, which has substantially the same amplitude and a phase difference of approximate 180 degrees with respect to the coupled signal Sc. In another embodiment, the signals St and S1 may be respectively configured to have the same amplitude, the attenuated amplitude, or the amplified amplitude with respect to the signal S0.

The antenna 140 receives the signal Sr and transmits it to the signal combining circuit 166. The signal combing circuit 166 combines the signal Sr and the signal S2 to generate a signal S3, which is transmitted to the receiving circuit 190. The receiving circuit 190 effectively receives the coupled signal Sc and the signal S3 (which comprises the signal S2 and the signal Sr). Because the signal S2 and the coupled signal Sc have substantially the same amplitude and a phase difference of approximate 180 degrees, the signal S2 may reduce or eliminate the influence of the coupled signal Sc. The receiving circuit 190 may, therefore, process the received signal Sr and achieve a better performance.

In one embodiment, the phase shifting circuit 164 is realized with one or more resistor-capacitor circuits for generating the required phase shift. In another embodiment, the phase shifting circuit 164 may also be realized with one or more trans-mission lines of appropriate lengths, or circuits with passive and/or active components.

In one embodiment, the signal combining circuit 166 wires the signal S2 and the signal Sr for generating the combined signal S3. In another embodiment, the signal combining circuit 166 converts the signals S2 and/or Sr into appropriate forms, e.g., into voltage form or current format, and generates the combined signal S3.

In one embodiment, the magnitude of the coupled signal Sc and the phase difference of the coupled signal Sc and the signal S0 may be measured in low interference or interference-free laboratories and/or estimated by software simulations. The measurement or simulation results of the magnitude of the coupled signal Sc and the phase difference of the coupled signal Sc and the signal S0 may be used to configure the signals dividing circuit 162 and/or the phase shifting circuit 164 for generating the signal S2, which has substantially the same magnitude and a phase difference of approximate 135 to 225 degrees with respect to the coupled signal Sc. The coupling effect of the coupled signal Sc may be reduced or eliminated by the signal S2. In another embodiment, the signal S2 may be configured to have substantially the same magnitude and a phase difference of 180 degrees with respect to the coupled signal Sc.

In yet another embodiment, the communication device 100 transmits signals through the antenna 140 and receives signals through the antenna 120. The transmitting circuit 170 is coupled with the antenna 140 for transmitting the signal St and the receiving circuit 190 is coupled with the antenna 120 for receiving the signal Sr.

In still another embodiment, there are multiple coupling paths between the transmitting signal 170 and the receiving signal 190. The signal processing circuit 160 and/or other signal processing circuits of the communication device 100 may be configured according to the measurement or simulation results of the magnitude of the coupled signal Sc and the phase difference between the coupled signal Sc and the signal S0 for reducing or eliminating the influence of the coupled signals between the transmitting circuit 170 and the receiving signal 190. For example, to reduce the influence of the coupled signals from two coupling paths, the signal processing circuit 160 may generate corresponding signals for canceling the coupled signals from the two coupling paths. In further another embodiment, multiple signal processing circuits may be used to generate corresponding signals for canceling the coupled signals Sc and therefore for reducing or eliminating the influence of the coupled signal Sc on the receiving circuit 190.

Figure 2:
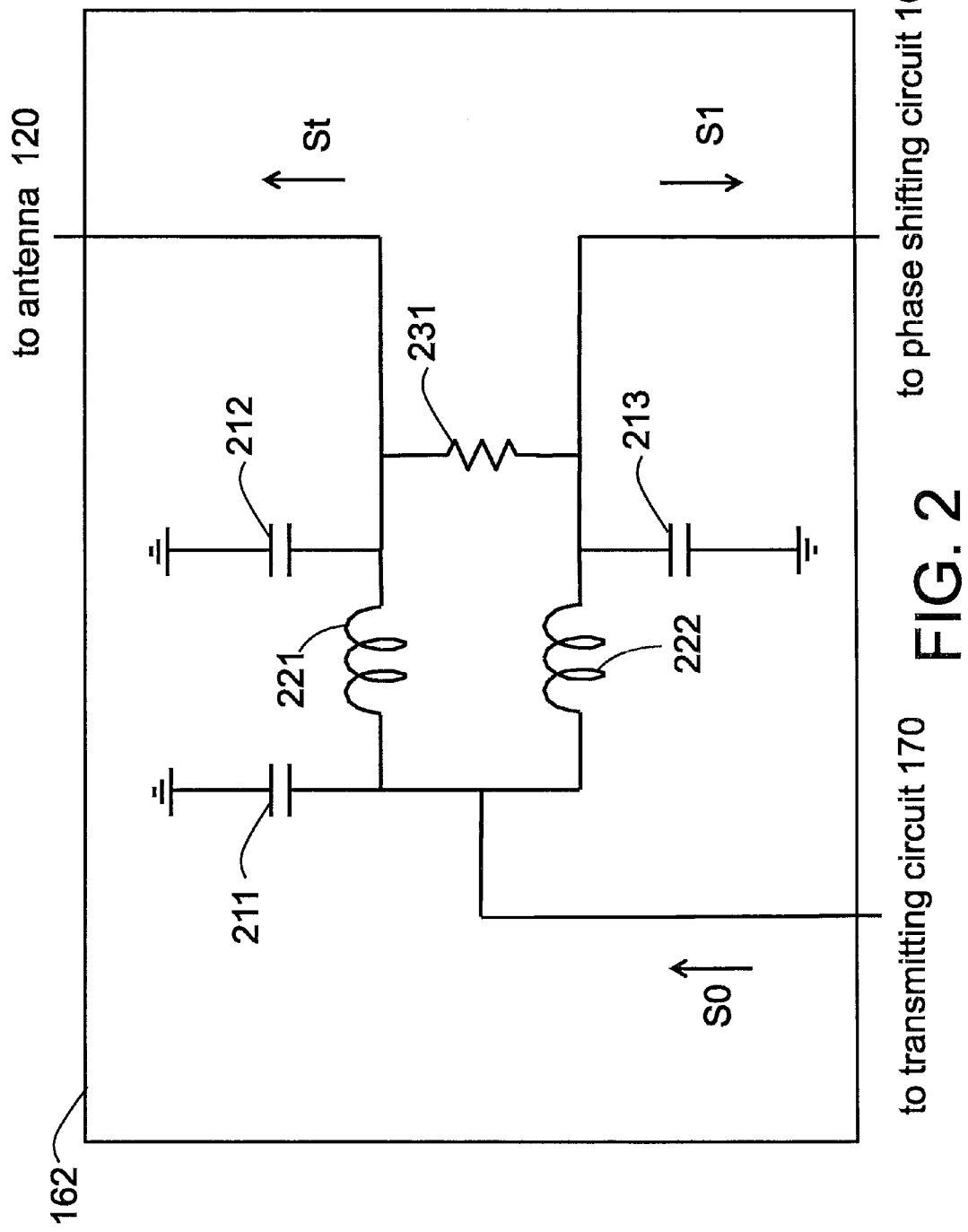
FIG. 2 shows a simplified block diagram of an example signal dividing circuit in FIG. 1.

FIG. 2 shows a simplified block diagram of an example signal dividing circuit 162 in FIG. 1. In this embodiment, the signal dividing circuit 162 comprises a Wilkinson power divider circuit. The signal dividing circuit 162 comprises capacitors 211, 212 and 213, inductors 221 and 222, and a resistor 231. The signal dividing circuit 162 is coupled with the transmitting circuit 170, the antenna 120, and the phase shifting circuit 164 for receiving and transmitting signals, respectively.

In one embodiment, the magnitude of the coupled signal Sc is approximately $1/\sqrt{2}$ of the magnitude of the signal S0. The signal dividing circuit 162 may be configured as an equally splitting Wilkinson power divider, which divides the signal S0 into two substantially equal magnitude signals St and S1. For example, the communication device 100 transmits and receives signals at approximately 2.4 GHz. The capacitors 211, 212, and 213 of the signal dividing circuit 162, i.e., the equally splitting Wilkinson power divider, are configured to be approximately 1.9 pF, 1 pF, and 1 pF, respectively. The inductors 214 and 215 are configured to be approximately 4.6 nH. The resistor 216 is configured to be approximately 100 ohm. The signal dividing circuit 162 may, therefore, generate two substantially equal magnitude signals St and S1.

In another embodiment, the magnitude of the coupled signal Sc is less than $1/\sqrt{2}$ of the magnitude of the signal S0. The signal dividing circuit 162 may be configured as an unequally splitting Wilkinson power divider, which divides the signal S0 into the signals St and S1. In this embodiment, the magnitude of the signals St and S1 are not equal. In some preferred embodiments, the signal dividing circuit 162 is configured so that the magnitude of the signal S1 is between $1/\sqrt{2}$ and $1/100$ of the magnitude of the signal S0.

Figure 3:
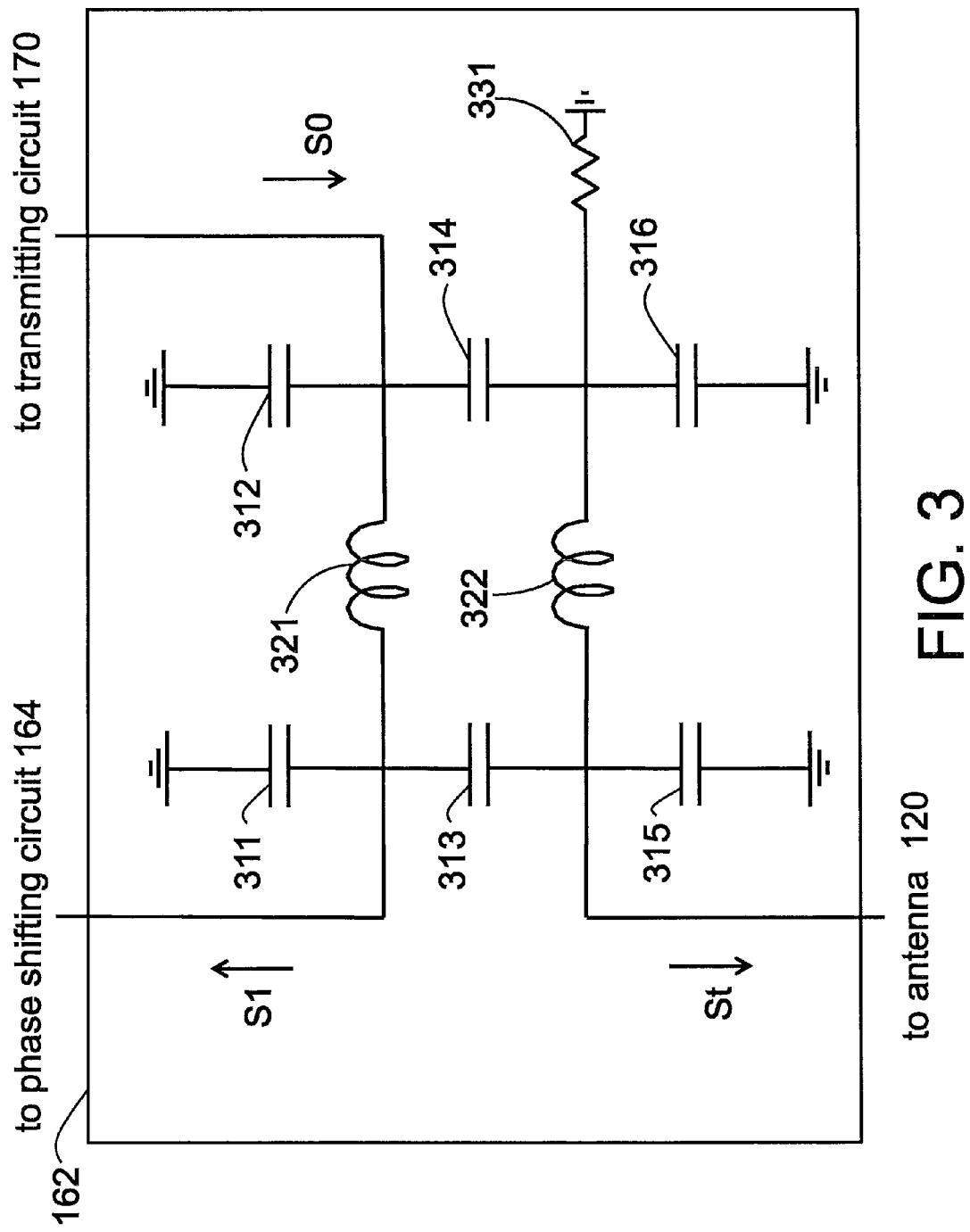
FIG. 3 shows a simplified block diagram of another example signal dividing circuit in FIG. 1.

FIG. 3 shows a simplified block diagram of another example signal dividing circuit 162 in FIG. 1. In this embodiment, the signal dividing circuit 162 comprises a directional coupler circuit for dividing the signal S0 into the signals St and S1. The signal dividing circuit 162 comprises six capacitors 311-316, inductors 321 and 322, and a resistor 331.

Figure 4:
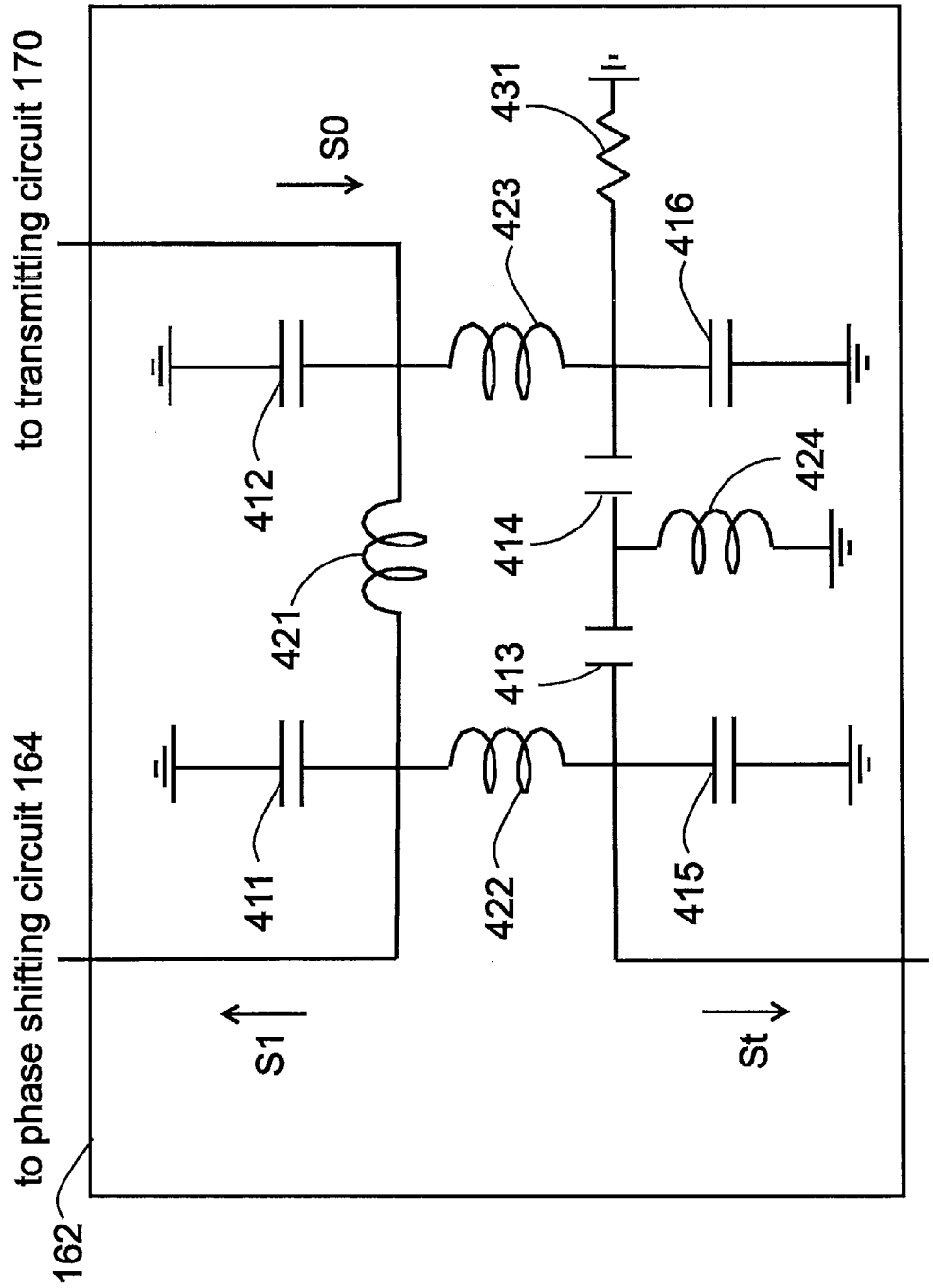
FIG. 4 shows a simplified block diagram of still another example signal dividing circuit in FIG. 1, all arranged in accordance with at least some embodiments of the present disclosure described herein.

FIG. 4 shows a simplified block diagram of still another example signal dividing circuit 162 in FIG. 1. In this embodiment, the signal dividing circuit 162 comprises a hybrid coupler circuit for dividing the signal S0 into the signals St and S1. The signal dividing circuit 162 comprises six capacitors 411-416, four inductors 421-424, and a resistor 431.

The figures and embodiments are illustrative only and not intended to limit the scope of the present invention. For example, the circuit 162, 164, 166, 170, and/or 190 may be realized with one or more circuits. The communication device 100 may comprise more antennas and circuits.

In the above embodiments, the values of the elements in the signal dividing circuit 162 may be configured according to different design considerations, for example, the magnitude of the coupled signal Sc, the frequency band and the bandwidth of the transmitting signals and the receiving signals, and/or the required bandwidth of the signal dividing circuit 162.

As shown in the aforementioned descriptions, the signal processing circuit 160 may be realized with passive elements, for example, resistors, capacitors, and/or inductors, and therefore only occupies a small space. Moreover, by appropriately configuring the values of the passive elements, the characteristics of the signal processing circuit 160 may be easily adjusted according to the magnitude of the coupled signals, the required bandwidth, and other design parameters. Besides, the signal processing circuit 160 and other decoupling approaches, e.g., isolators and increasing the distance of antennas, may be jointly implemented in the electronic devices to achieve a better system performance.

Other embodiments of the invention will be apparent to those skilled in the art from consideration of the specification and practice of the invention disclosed herein. It is intended that the specification and embodiments be considered as exemplary only, with a true scope and spirit of the invention being indicated by the following claims.

What is claimed is:

1. A signal processing circuit, comprising:
    a first node for coupling with a first antenna;
    a second node for coupling with a second antenna;
    a third node for receiving a first signal from a transmitting circuit;
    a signal dividing circuit, coupled with the first node and the third node, for dividing the first signal into a second signal and a third signal and transmitting the second signal to the first antenna;
    a phase shifting circuit, coupled with the signal dividing circuit, for shifting the phase of the third signal to generate a fourth signal; and
    a signal combining circuit, coupled with the phase shifting circuit and the second node, for combining the fourth signal and a fifth signal received from the second antenna,
    wherein the fourth signal cancels at least part of a coupled signal coupled between the third node and the fourth node.

2. The signal processing circuit of claim 1, wherein the magnitude of the fourth signal is configured to be between $1/\sqrt{2}$ to $1/100$ of the magnitude of the first signal.

3. The signal processing circuit of claim 1, wherein the fourth signal and the coupled signal have substantially the same magnitude.

4. The signal processing circuit of claim 1, wherein the fourth signal and the coupled signal have a phase difference between 135 degrees and 225 degrees.

5. The signal processing circuit of claim 1, wherein the signal dividing circuit comprises at least one of a Wilkinson power divider circuit, a directional coupler circuit, and a hybrid coupler circuit.

6. The signal processing circuit of claim 1, wherein the phase shifting circuit comprises one or more transmission lines, and/or one or more resistor-capacitor circuits.

7. A communication method, comprising:
    dividing a first signal into a second signal and a third signal;
    transmitting the second signal to a first antenna;
    shifting the phase of the third signal to generate a fourth signal;
    receiving a fifth signal from a second antenna;
    combining the fourth signal and the fifth signal; and
    canceling at least part of a coupled signal coupled between the first antenna and the second antenna with the fourth signal.

8. The method of claim 7, further comprising configuring the magnitude of the fourth signal to be between $1/\sqrt{2}$ to $1/100$ of the magnitude of the first signal.

9. The method of claim 7, further comprising configuring fourth signal to have substantially the same magnitude as the coupled signal.

10. The method of claim 7, further comprising configuring the fourth signal to have a phase difference between 135 degrees and 225 degrees with respect to the coupled signal.

11. The method of claim 7, wherein the step of dividing the first signal further comprising:
    dividing the first signal into the second signal and the third signal with at least one of a Wilkinson power divider circuit, a directional coupler circuit, and a hybrid coupler circuit.

12. The method of claim 7, wherein the step of shifting the phase of the third signal further comprising:
    shifting the phase of the third signal with one or more transmission lines, and/or one or more resistor-capacitor circuits.

13. A communication device, comprising:
    a first node for coupling with a first antenna;
    a second node for coupling with a second antenna;
    a third node for coupling with a transmitting circuit;
    a fourth node for coupling with a receiving circuit; and
    a signal processing means, coupled with the first, the second, the third, and the fourth nodes, for receiving a first signal from the transmitting circuit, dividing the first signal into a second signal and a third signal, transmitting the second signal to the first antenna, shifting the phase of the third signal to generate a fourth signal, combining the fourth signal and a fifth signal received from the second antenna, and transmitting the combined signal to the receiving circuit,
    wherein the fourth signal cancels at least part of a coupled signal coupled between the third node and the fourth node.

14. The communication device of claim 13, wherein the magnitude of the fourth signal is configured to be between $1/\sqrt{2}$ to $1/100$ of the magnitude of the first signal.

15. The communication device of claim 13, wherein the fourth signal and the coupled signal have substantially the same magnitude.

16. The communication device of claim 13, wherein the fourth signal and the coupled signal have a phase difference between 135 degrees and 225 degrees.

* * * * *